Figure 1:
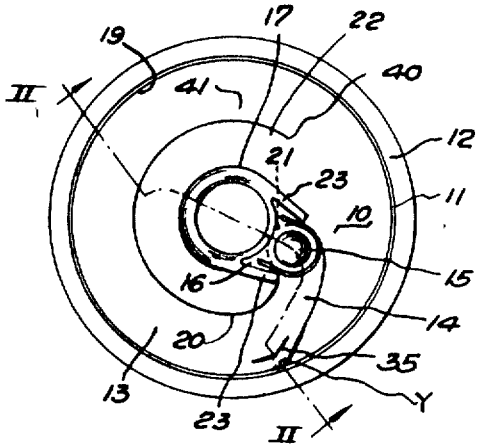
Figure 2:
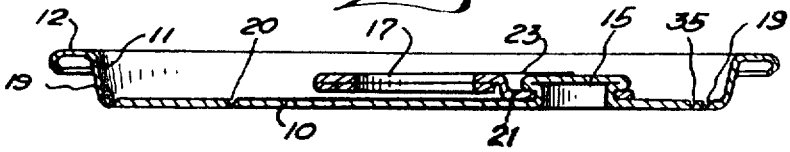
Figure 3:
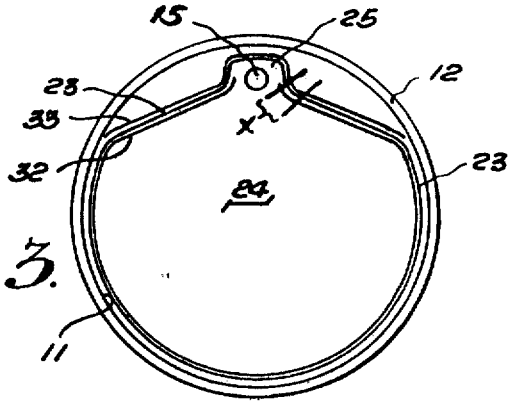
Figure 4:
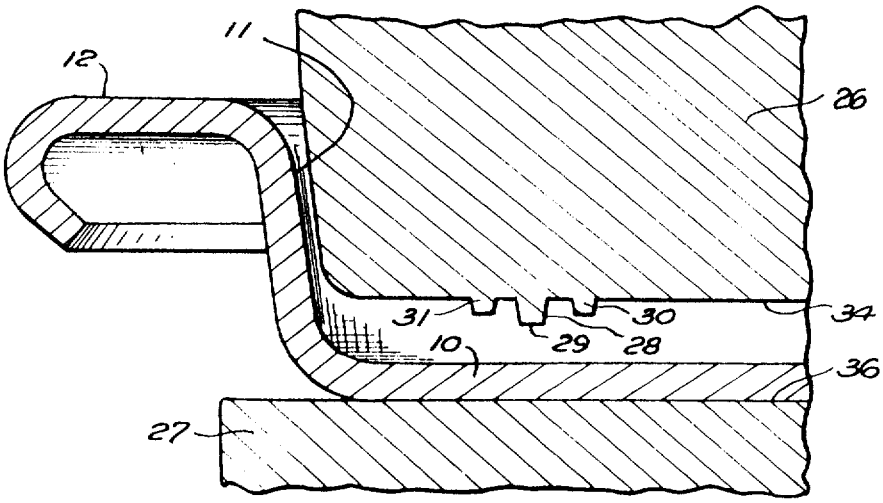
Figure 5:
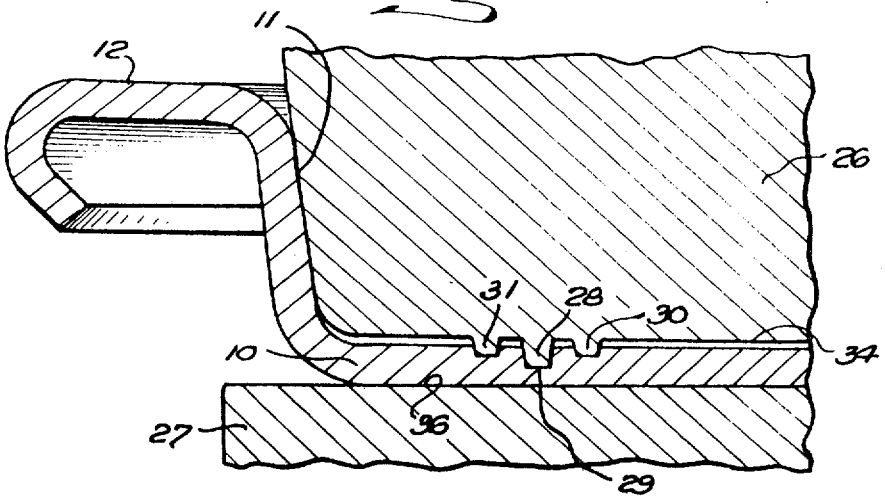
Figure 6:
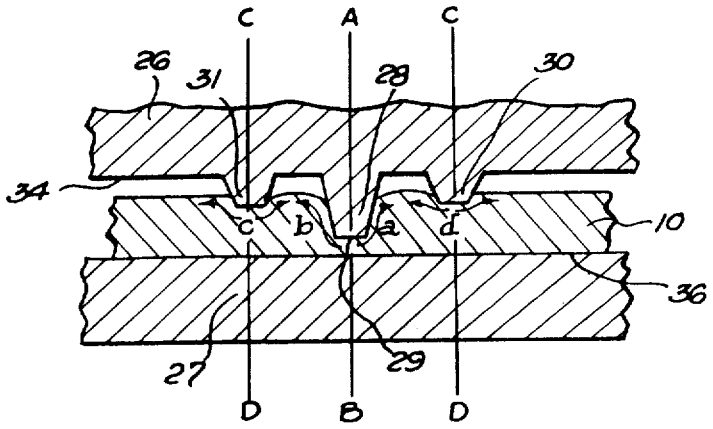
Figure 7:
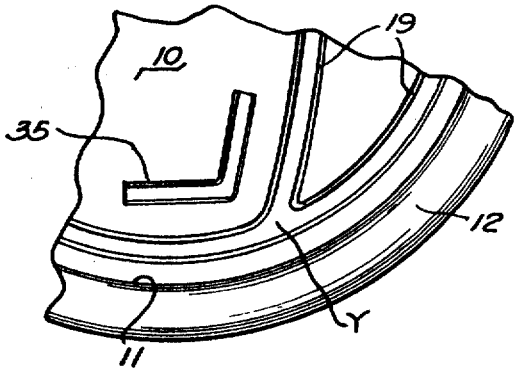

T 866014

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 701

793,231

CONTAINER END HAVING EASY-OPENING MEANS

Lloyd G. Dunn, Lower Burrell, Pa., assignor to Aluminum Company of America, Pittsburgh, Pa., a corporation of Pennsylvania

Continuation of application Ser. No. 732,696, May 28, 1968, which is a division of application Ser. No. 584,431, Oct. 5, 1966. This application Jan. 13, 1969. Published Sept. 16, 1969

Int. Cl. B65d *17/20*

U.S. Cl. 220—54

3 Sheets Drawing. 12 Pages Specification

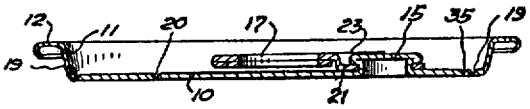

A metal container panel provided with a tear-out section defined by a first score line, and with an anti-fracture score line adjacent the first score line on one or both sides thereof through less metal thickness than the first score line to prevent fracturing of the metal in the container panel. The tear-out section may be of a variety of configurations such as spiral, teardrop or full panel pull-out, and the anti-fracture score line can be formed either along preselected lengths of the first score line may or may not be parallel to the first score line, and is particularly beneficial when formed along junctions and sharp corners in the first score line. A tear-out section in a container panel may be formed by supporting the panel on an anvil die, scoring the metal to a substantial depth by means of a scoring rib which causes the metal to be displaced and extruded, and while scoring is continued to the final desired depth, simultaneously scoring the metal adjacent and in close proximity to the first score line with an indentor to form an anti-fracture score and thereby trapping the extruded metal between the scoring rib and indentor.

T 866,014

793,231'
DEF. PUB.

Sept. 16, 1969

L. G. DUNN

CONTAINER END HAVING EASY-OPENING MEANS

Original Filed Oct. 5, 1966

3 Sheets-Sheet 1

INVENTOR.
LLOYD G. DUNN.

BY
Frederick A. Widner, Jr.
ATTORNEY.

T 866,014

Sept. 16, 1969 L. G. DUNN DEF. PUB.

CONTAINER END HAVING EASY-OPENING MEANS

Original Filed Oct. 5, 1966 3 Sheets-Sheet 2

INVENTOR.
LLOYD G. DUNN.
BY
Frederick Q. Weidner, Jr.
his
ATTORNEY.

T 866,014

Sept. 16, 1969 L. G. DUNN DEF. PUB.

CONTAINER END HAVING EASY-OPENING MEANS

Original Filed Oct. 5, 1966 3 Sheets-Sheet 3

INVENTOR.
LLOYD G. DUNN.

BY
Frederick P. Weidner, Jr.
HIS ATTORNEY.